(12) United States Patent
Oltman et al.

(10) Patent No.: US 9,071,532 B2
(45) Date of Patent: Jun. 30, 2015

(54) METHOD FOR DISCOVERY AND LOAD BALANCING OF PATH COMPUTATION ELEMENTS BASED ON TRANSPORT PLANE LINK METRICS

(75) Inventors: John K. Oltman, Chamblee, GA (US); Lyndon Y. Ong, Sunnyvale, CA (US)

(73) Assignee: Ciena Corporation, Hanover, MD (US)

( * ) Notice: Subject to any disclaimer, the term of this patent is extended or adjusted under 35 U.S.C. 154(b) by 720 days.

(21) Appl. No.: 13/279,977

(22) Filed: Oct. 24, 2011

(65) Prior Publication Data

US 2013/0100817 A1     Apr. 25, 2013

(51) Int. Cl.

| | |
|---|---|
| *H04J 1/16* | (2006.01) |
| *H04L 12/729* | (2013.01) |
| *H04L 12/715* | (2013.01) |
| *H04L 12/717* | (2013.01) |
| *H04L 12/24* | (2006.01) |
| *H04L 12/707* | (2013.01) |
| *H04L 12/703* | (2013.01) |

(52) U.S. Cl.
CPC .............. *H04L 45/125* (2013.01); *H04L 41/12* (2013.01); *H04L 45/04* (2013.01); *H04L 45/22* (2013.01); *H04L 45/28* (2013.01); *H04L 45/42* (2013.01)

(58) Field of Classification Search
CPC ................ H04L 47/10–47/35; H04L 12/5602; H04L 2012/5636; H04L 43/50; H04L 45/26; H04L 45/125; H04L 45/04; H04L 45/22; H04L 45/12; H04L 45/126; H04W 40/02–40/34

USPC ................... 370/229, 231, 232, 235, 238, 248
See application file for complete search history.

(56) References Cited

U.S. PATENT DOCUMENTS

| | | | | |
|---|---|---|---|---|
| 6,996,065 | B2 * | 2/2006 | Kodialam et al. ............ | 370/238 |
| 7,151,773 | B1 * | 12/2006 | Mo et al. ...................... | 370/392 |
| 7,599,349 | B2 * | 10/2009 | Vasseur et al. ............... | 370/351 |
| 7,808,972 | B2 * | 10/2010 | Zhang .......................... | 370/351 |
| 8,630,295 | B1 * | 1/2014 | Ayyangar et al. ......... | 370/395.3 |
| 8,681,634 | B2 * | 3/2014 | Zhang et al. ................. | 370/238 |
| 8,750,127 | B2 * | 6/2014 | Zhang et al. ................. | 370/238 |
| 2006/0098657 | A1 * | 5/2006 | Vasseur et al. ............... | 370/392 |
| 2008/0205271 | A1 * | 8/2008 | Aissaoui et al. ............. | 370/235 |
| 2008/0232372 | A1 * | 9/2008 | Ong et al. ..................... | 370/392 |
| 2011/0019674 | A1 * | 1/2011 | Iovanna et al. ............... | 370/392 |
| 2012/0308225 | A1 * | 12/2012 | Long et al. ..................... | 398/13 |

* cited by examiner

*Primary Examiner* — Brian O'Connor
(74) *Attorney, Agent, or Firm* — Clements Bernard PLLC; Christopher L. Bernard; Lawrence A. Baratta, Jr.

(57) ABSTRACT

A method and system for path computation in a communications network having multiple domains are disclosed. According to one aspect, a method of path computation across multiple domains includes identifying a plurality of border nodes at borders of a plurality of domains, each domain having at least one border node. The method includes providing a path computation element at each of the plurality of border nodes of the domains of the network. The locations of the path computation elements are known to be at the border nodes prior to determining a path in response to a path computation request.

16 Claims, 4 Drawing Sheets

METHOD FOR DISCOVERY AND LOAD BALANCING OF PATH COMPUTATION ELEMENTS BASED ON TRANSPORT PLANE LINK METRICS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks and in particular to a method and system for discovery and load balancing of path computation elements in a multiple-domain communication network.

BACKGROUND OF THE INVENTION

Path computation elements (PCE) have been defined in standards that specify requirements of control planes in communication networks. The path computation elements perform a task of computing end-to-end paths, either within a network domain or across multiple network domains. The path computation function can be separated from other control plane functions and can be separated from a network element that is a source of a communication.

For example, a path computation element may be associated with each network domain. In a first mode of operation, wherein a forward path computation is utilized, a source node in a first domain sends a path computation request on a first path to a first path computation element (PCE) associated with a second domain. The first PCE computes a shortest path across the second domain. The first PCE also forwards the path computation request on a path to a second PCE associated with a third domain that has the destination node of the path request. The second PCE computes a shortest path across the third domain to a destination node in the third domain.

In a second mode of operation, wherein a backward path computation is utilized, the source node or path computation client (PCC) sends a path computation request to a PCE in the second domain which sees the destination lies in the third domain. This PCE then acts as a PCC and forwards the path computation request to a PCE in the third domain. Seeing the destination of the path computation request lies within its domain, the PCE in the third domain calculates a virtual shortest path tree (VSPT) and provides a response to the PCC/PCE in the second domain. The PCC/PCE in the second domain processes this response and similarly extends the virtual shortest path tree computation to include resources within its domain. This result is then returned to the source node or PCC in the originating domain. Using the calculated VSPT provided by the PCE in domain 2 and 3, the originating node is capable of computing an optimized path to the destination.

Thus, when a path is to be computed between a source in a first domain, across an intermediate second domain, to a destination in a third domain, each path computation element may compute an optimized path or paths across its own corresponding domain. The complete path is calculated based on the cooperative calculation between PCE in each domain to achieve an optimized path. Path optimization performed by the PCE includes constraint based routing which may include cost, latency, and diversity as criteria. As used herein, the shortest path may refer to a least cost path.

There are two methods commonly used for discovering and selecting path computation elements to use for determining a route through a domain. One method is by static configuration and another method is PCE discovery by advertisement of PCE locations and characteristics. Static configuration requires that additional management and administration functions be performed to configure each potential source node or PCC (network element, (NE)) with the identity and address of PCE in an adjacent domain. This method does not allow the source node to respond to changes in the PCE and further limits the ability to load-balance traffic across multiple PCEs. The method of PCE discovery requires development of software for each potential source node or PCC, thereby incurring complexity, testing and interoperability issues. Further, the discovery protocol adds to the control plane overhead traffic due to the need to advertise the PCEs. In general, PCE discovery still requires the source node or PCC to select which PCE in an adjacent domain to utilize.

What is needed, therefore, is a communication method and system using PCEs that does not require static configuration or the complexity of PCE discovery based on advertisement.

SUMMARY OF THE INVENTION

The present invention advantageously provides a method and system for path computation in a communication network having multiple domains. According to one aspect, a method of path computation across multiple domains includes identifying a plurality of border nodes at the interfaces between a plurality of domains, where each domain has at least one border node. A path computation element is provided at each of the plurality of border nodes of the domains of the network. The locations of the path computation elements are known by network design to be at the border nodes prior to a PCC/source node issuing a path computation request.

According to another aspect, the present invention provides a first path computation element situated at a first border node of a first domain in a multiple-domain communication network. The first path computation element includes a memory and a processor. The memory stores a location of a second border node of a second node adjacent to the first domain, and stores a location of a third border node of the second domain. Each of the second and third border nodes has a second and third path computation element respectively. The processor is operable to receive a path computation request from one of a source node and path computation element in a first adjacent domain. The processor is further operable to compute a set of least cost paths across the first domain between border nodes of the first domain and one of border nodes of a second adjacent domain and a destination node of the first domain if the destination node is in the first domain. If the destination node is not within the first domain, then the processor is operable to select a path computation element in the second adjacent domain based at least in part on load balancing criteria.

According to another aspect, the invention provides a method of routing packets in a communication network from a source node to a destination node. The method includes identifying a path computation element at each border node of a plurality of network domains. The method further includes determining a path between a first border node of a first domain to a second border node of a second domain, each of the first and second border nodes having a first and second path computation element, respectively.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
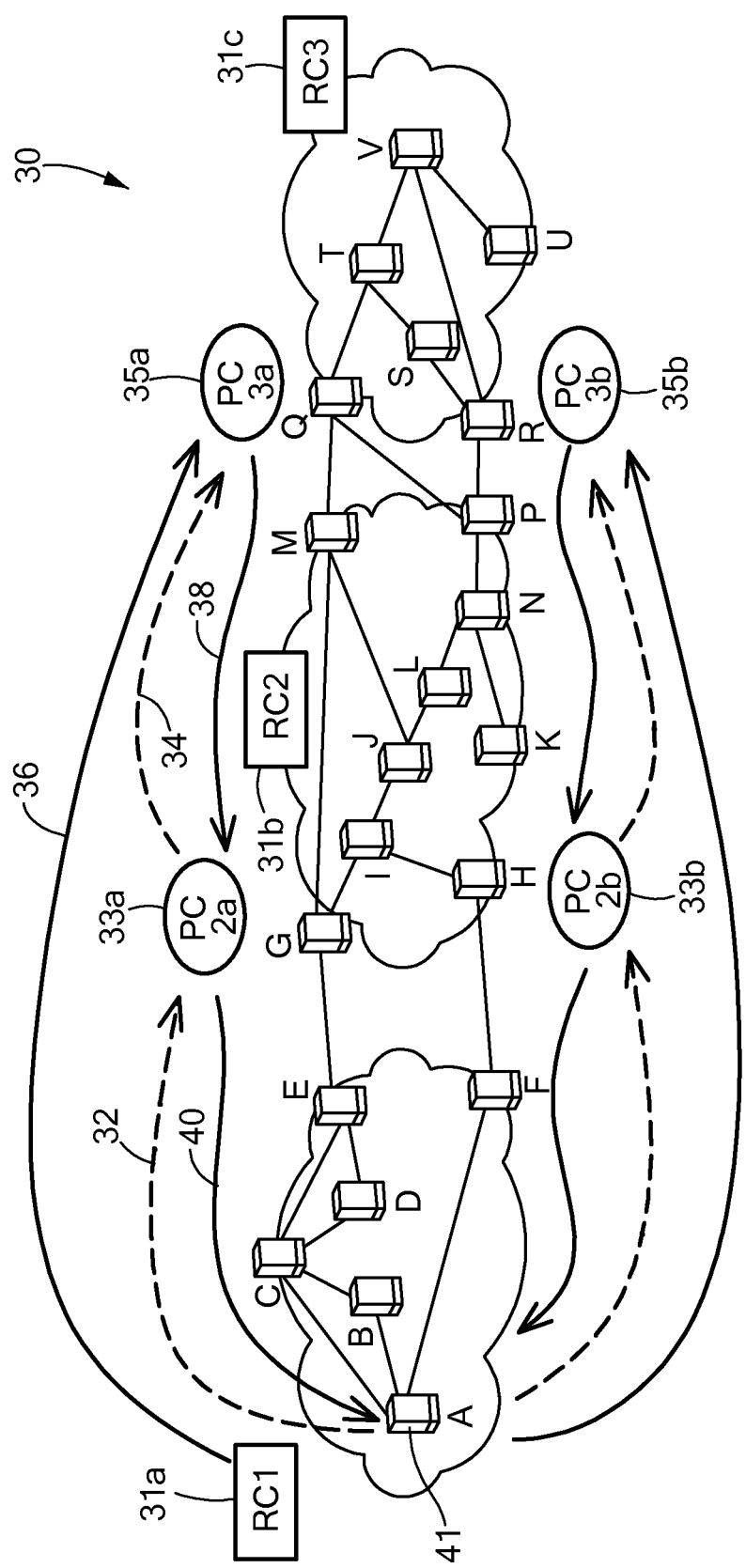
FIG. 1 is a block diagram of communication network with PCEs located at border nodes, the network constructed in accordance with the principles of the present invention.

Before describing in detail exemplary embodiments that are in accordance with the present invention, it is noted that the embodiments reside primarily in combinations of apparatus components and processing steps related to implementing a system and method for determining communication paths across multiple network domains in a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements Referring now to the drawing figures, in which like reference designators denote like elements, there is shown in FIG. 1 a communication network with three network domains associated with three route controllers, RC1 31a, RC2 31b, and RC3 31c (collectively referred to herein as "route controllers 31"). A purpose of the route controllers is to advertise an abstracted topology between domains, i.e., to disseminate the location and address of the border nodes and any other topology the network administrator desires to advertise. Packets of information are routed according to a path determined by path computation elements PC2a 33a, PC2b 33b, PC3a 35a and PC3b 35b (collectively referred to herein as "path computation elements", 33 and 35, respectively).

In a first mode of operation, when a forward path computation is utilized, a source node A 41 in a first domain sends a path computation request on a first path 32 to a path computation element PC2a 33a associated with a second domain. The PC2a 33a computes a shortest path across the second domain. The PC2a 33a forwards the path computation request on a path 34 to a path computation element PC3a 35a associated with a third domain that has the destination node of the path request. Note that the path computation request need not follow the shortest path. The PC3a 35a computes a shortest path across the third domain to a destination node in the third domain. Similarly, routes through PC2b 33b and PC3b 35b can also be generated when, for example, load balancing between two alternate paths is desired. The computed path is then sent back to the originating node in the first domain via the path computation elements 33a and 35a. Note that the computed path may or may not include one or more of the border nodes used to compute the path.

In a second mode of operation, wherein a backward path computation is utilized, the source node A 41 sends a path computation request on a path 32 to the PC2a 33a, which forwards the request to PC3a 35a along a path 34. Once the request reaches PC 3a 35a, PC 3a 35a determines a least cost path across the third domain to the destination node. This information is routed back on a path 38 to the path computation element PC 2a 33a. PC 2a 33a computes a least cost path across the second domain from the third domain to the first domain. This least cost path information, in addition to the least cost path information for traversing the third domain, is sent on path 40 to the originating node A 41. Note, that a backward path computation may calculate a requested path using a different algorithm than the forward path calculation that may be more efficient.

Figure 2:
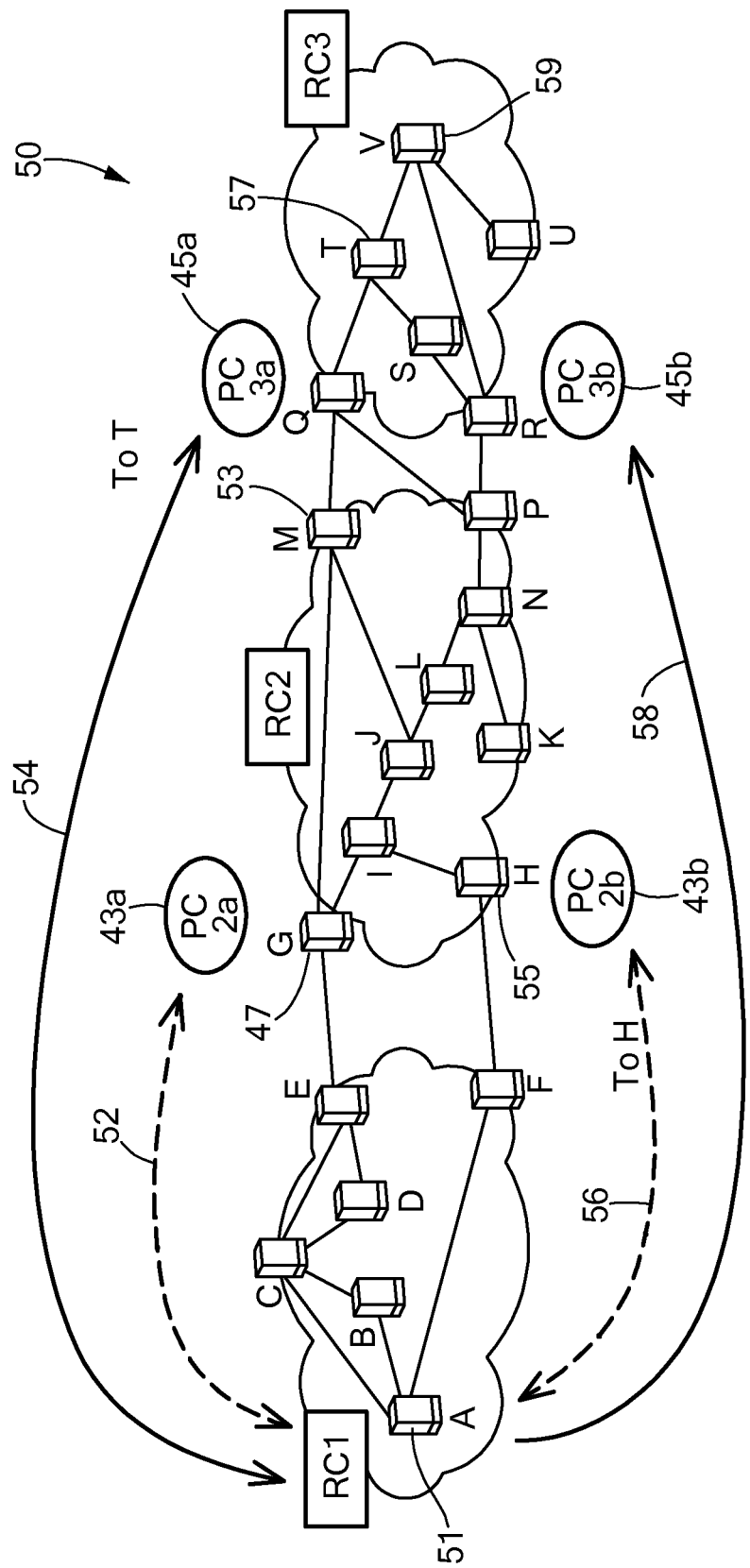
FIG. 2 is a block diagram of an exemplary network with PCEs located at border nodes, in which the network is configured for PCE load sharing in accordance with the principles of the present invention.

Note that a difference between known path computation arrangements and the network of FIG. 2 is that in known solutions, the path computation element is associated with a network domain but is not necessarily associated with any particular network element. In contrast, in the network of FIG. 2, there is a path computation element associated with each border (edge) node of a network domain. Thus, knowledge of the identity of a border node is equivalent to knowledge of the location of a path computation element. For this reason, advertisement of path computation locations is not required.

Rather, data plane topology and metrics are used for control plane PCE selection. For example, the assignment of PCEs to border nodes does not require configuration of PCE addresses as an additional step in management. Also, the assignment of PCEs to border nodes supports adjustment to dynamic conditions such as loss of connectivity to a particular PCE, by merely selecting a connected PCE to compute a path. Further, because more than one border node typically connects two adjacent network domains, load balancing is easily achieved by choosing one border node as the PCE to be used for path computation rather than the other border node. The present invention may use existing transport plane topology and routing advertisements to balance the load, and consequently, contributes no additional overhead to the control plane traffic.

Thus, referring again to FIG. 1, the source node A 41 knows from the data plane topology where to access the PCE functionality since source node A 41 knows a priori where the border nodes are located, without additional advertising to locate the PCEs. There are as many potential PCEs as there are border nodes. This enables sharing of the load among PCEs. Load balancing can be performed based on the minimum cost data plane path from the source to a border node for a particular connection destination, thereby enabling selection of different border nodes for PCE functionality based on connection destination. If connection destinations are randomly or evenly distributed, then the load of PCE requests should be fairly evenly distributed across the set of border nodes performing path computation.

An example of load balancing based on destinations is described with reference to FIG. 2. In FIG. 2, four paths from a source node A 51 to four different destinations M 53, H 55, T 57, and V 59 are routed using four different border nodes as path computation elements (PCE). For example, for a path 52 from source node A 51 to destination node M 53, the path computation element PC2*a* 43*a* at border node G 47 computes a path to destination node M 53. For a path 54 from source node A 51 to destination T 57, the path computation element PC3*a* 45*a* may be used to compute the path to destination T 57. For a path 56 from source node A 51 to destination node H 55, the path computation element PC2*b* 43*b* may be used to compute the path. For a path 58 from source node A 51 to destination node V 59, the path computation element PC3*b* 45*b* may be used to compute the path. Thus, in one embodiment, a path computation request may be directed to a border node with a shortest path to the destination. Thus, in general, to establish a path from a source node in the leftmost domain to a destination node in the rightmost domain of FIG. 2, the source node A 51 would select PC 2*a* 43*a* or PC 2*b*, 43*b*. PC 2*a* 43*a* or PC2 *b* 43*b* would then select one of PC 3*a* 45*a* or PC 3*b* 45*b*. It will be understood by persons of ordinary skill in the art that more than one intermediate node may be accommodated.

Thus, in one embodiment, a PCC may select a PCE in an adjacent domain by determining the least cost path to any of a plurality of border nodes in the adjacent domain based on existing link metrics. In the event of a request timeout or known failure on the path, an alternate PCE may be selected by finding the next least cost path to another PCE in the adjacent domain based on existing link metrics.

In the case of a forward path computation, the PCE of the first domain will calculate the least cost path which meets the constraints of bandwidth and service class for the connection request across its domain and then take on the role of PCC. The PCE of the first domain selects a second PCE in a second domain by using the existing link metrics for cost and latency without regard to the bandwidth and service class constraints of the connection request. The second domain may be adjacent to the first domain or a non-adjacent domain. The first PCC/PCE of the first domain then forwards the connection request to the second PCE of the second domain along with the path information from which to calculate the connection request. The second PCE in the second domain repeats this same process which may continue across a plurality of PCE and domains until reaching the domain which contains the end point of the connection. Upon reaching the final domain which includes the end point of the connection request, the PCE in this domain calculates the least cost path which meets the constraints of bandwidth, and service class of the connection to the end point of the connection based on the accumulated end-to-end path accumulated as the connection request propagates across domains. The final PCE, then responds with the completed path of the connection request to the PCC in the previous domain, which in turn forwards the answer back, until reaching the initiator of the connection request. The initiator of the connection request may then signal for the actual connection setup across multiple domains which meets the least cost for a path which supports the bandwidth and class of service of the connection request.

In the case of a backward recursive path computation, a connection request is sent to the PCE of the last domain that contains the destination node. The PCE of the last domain that contains the destination node computes a least cost path across the last domain from the PCE to the destination. The PCE of the last domain also selects a second PCE of the next to last domain by using existing link metrics for cost and latency and then forwards the connection request to the second PCE along with the path information from which to calculate the connection path. The second PCE selects a third PCE of the next domain and computes a path across its domain to a third PCE. This process is repeated until the domain that has the source node that initiated the request is reached. The initiator of the connection request may then signal for the actual connection setup across the multiple domains which meets the least cost for a path that supports bandwidth and a class of service of the connection request.

Figure 3:
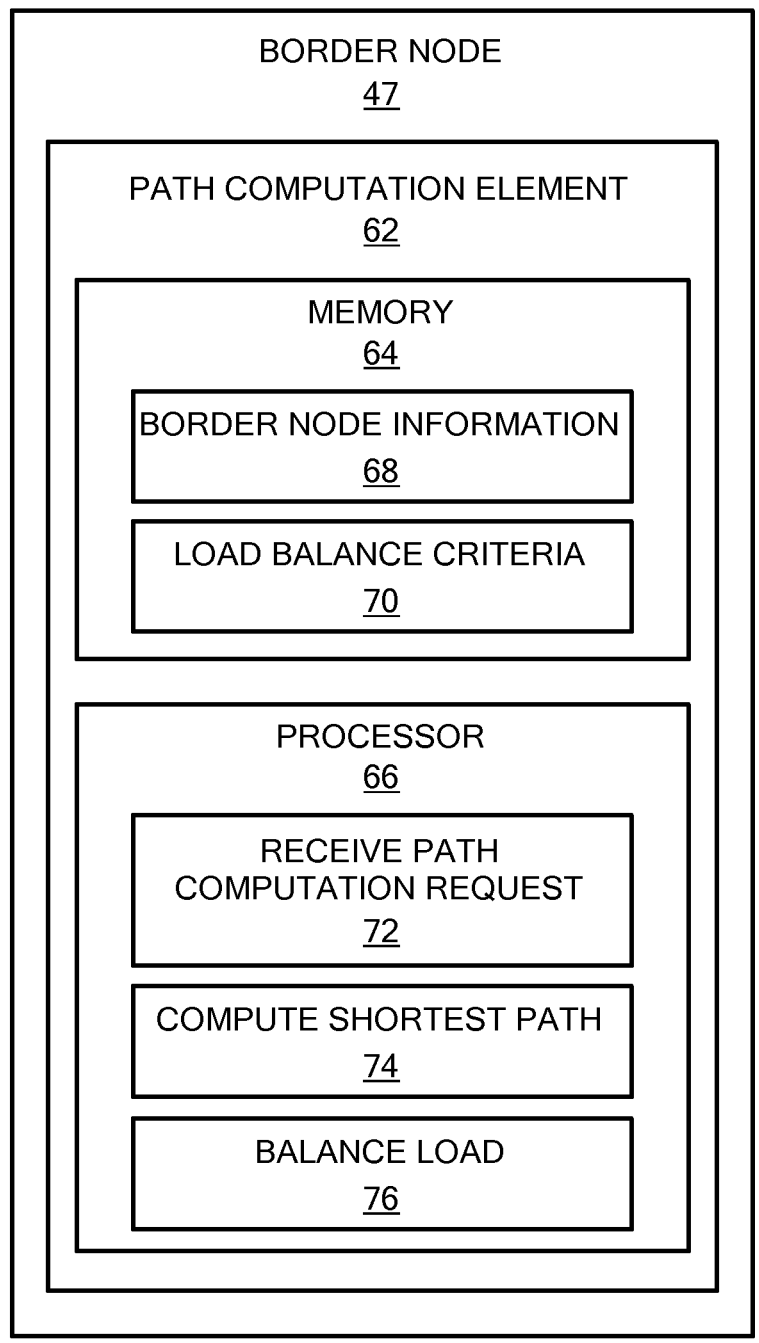
FIG. 3 is a block diagram of an exemplary border node having a path computation element constructed in accordance with principles of the present invention.

FIG. 3 is a block diagram of an exemplary border node such as border node 47 of a first domain that includes a path computation element 62. Note that, in some embodiments, it is contemplated that the path computation element may be physically separate from the border node 47 but collocated with the border node 47. In other words, the path computation element 62 need not be resident on the same physical hardware device as the border node 47. The path computation element 62 has a memory 64 and a processor 66. Note that in some embodiments the functionality of the path computation element 62 may be implemented by a processor that is shared with the border node 47, i.e., performs border node functions other than path computation, or may be implemented by a separate processor dedicated to path computation.

The memory 64 stores border node information 68 including a location of a second border node of a second domain adjacent to the first domain. The memory 64 also stores a location of a third border node of the second domain. The memory 64 also stores load balance criteria 70. Further, the memory 64 stores link attributes such as cost/latency and shared risk groups of a first domain of which the border node is a member so that it can create optimized paths across its domain. The processor 66 executes instructions to receive a path computation request 72 from a source node and to compute a shortest path 74 from the source node to one of the second border node and the third border node. The one of the second border node and the third border node may be selected based on load balancing criteria 70. Thus, the processor 66 also performs load balancing 76. The load balancing criteria may be a comparison of a volume of traffic through the second node to a volume of traffic through the third node. In another embodiment, the load balancing criteria may include comparison of a volume of traffic through one of the second and third nodes to a threshold. In some embodiments, the processor 66 receives notification when a failure in a path that contains a border node occurs, and computes a restoration path through a different border node.

Figure 4:
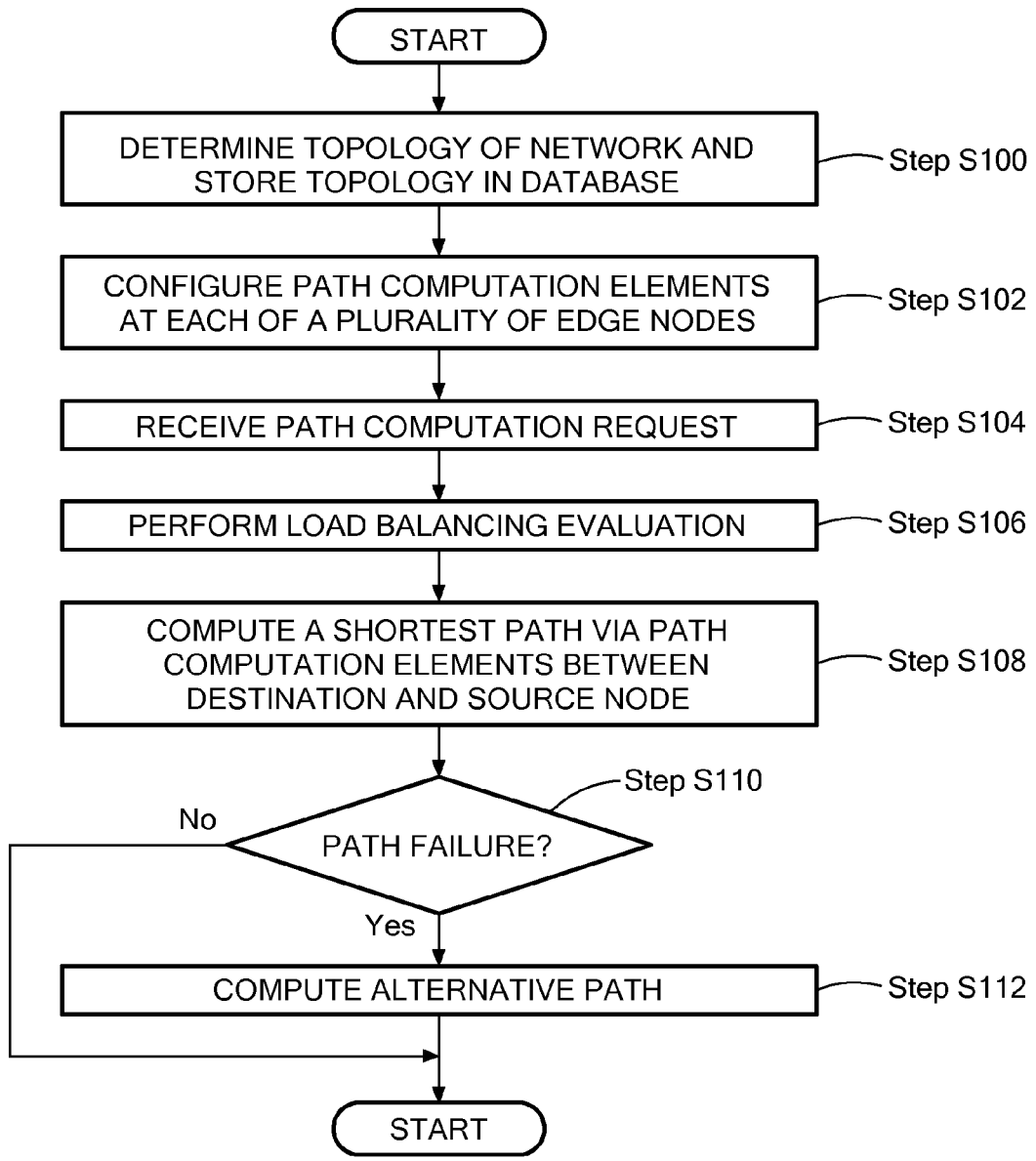
FIG. 4 is a flow chart of an exemplary process for path computation in a multiple domain network.

FIG. 4 is a flowchart of an exemplary process for path computation in a multiple domain network. In a first step, the topology of the network is determined by conventional means and stored in a database (step S100). When discovering the topology, the border nodes at the borders of a plurality of network domains are identified. In another step, a path computation element is configured at each of the plurality of border nodes of the network domains, so that locations of the path computation elements are known by virtue of knowing the locations of the border nodes (step S102).

During normal operation, a first border node of a first domain receives a path computation request from a source node (step S104). The path computation request specifies the source node and the destination node. The source node performs a load balancing evaluation to select a particular one of a plurality of border nodes (step S106). A path is computed via path computation elements between the source and destination nodes (step S108). If a failure along a path occurs, (step S110), an alternate path computation element is computed (step S112). In some embodiments, during a path discovery phase, prior to processing path computation requests, a plurality of shortest paths between border nodes are computed. Further, a new shortest path determination may be made in response to failure along an existing shortest path.

Thus, the above-described method may be used for initial connection provisioning as well as for computing a recovery path for mesh restoration in the event of a fault. In one embodiment, a plurality of border nodes at the borders of a plurality of network domains are identified. A path computation element is configured at each of the identified border nodes. In forward path computation, the first border node, upon receipt of a path computation request, computes a shortest path across the first domain, and forwards the path computation information to a next border node of a next domain, which computes a path across its domain, and the process of path computation continues until the last border node contained in the domain that contains the destination node is reached. Upon completion of path computation by the last border node, the total path computation may be returned to the source nodes via the border nodes used in the path computation. In backward path computation, the path computation request is forwarded to the last border node, which computes a path across the last domain to the destination node. This path computation information is sent back to the next-to-last border node which computes a path across its domain, and then forwards the path computation information back to the next node and so forth until the first border node is reached. The first border node then computes a path across its domain, and forwards the total path computation to the source node.

In one embodiment, the border nodes for path computation are selected from among a plurality of border nodes based on load balancing criteria to balance traffic between the selected border nodes and the other border nodes. In some embodiments, when a failure occurs along any one path, an alternate path is computed using a path computation element that is not on the failed path. Because the path computation elements are known to be at the border nodes, advertising of path computation elements is not needed.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a router, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of path computation across multiple domains in a communication network, the method comprising:
   identifying a plurality of border nodes at interfaces between a plurality of domains, each domain having at least one border node;
   including a path computation element at each of the plurality of border nodes of the domains, such that locations of the path computation elements are known to exist in the plurality of border nodes of the domains prior to an issuing of a path computation request;
   selecting a first path computation element of a first border node based on load balancing criteria between the first border node of a first domain and a third border node of the first domain;
   receiving a path computation request at the first border node of the first domain from a source node, the path computation request specifying the source node and a destination node; and
   computing by the path computation element of the first border node a shortest path across the first domain.

2. The method of claim 1, further comprising performing a forward path computation at the plurality of border nodes.

3. The method of claim 1, further comprising performing a backward path computation at the plurality of border nodes.

4. The method of claim 1, further comprising performing a backward path computation at a first set of one or more border nodes and performing a forward path computation at a second set of one or more border nodes.

5. The method of claim 1, wherein a second border node is selected to balance path computation requests between the second border node of the second domain and a fourth border node of the second domain.

6. A first path computation element of a first border node of a first domain, the first path computation element comprising:
   a memory, the memory storing a location of a second border node of a second domain and storing a location of a third border node of the second domain, the second border node having a second path computation element and the third border node having a third path computation element; and
   a processor, the processor:
   receiving a path computation request from one of a source node or a path computation client in the first domain; and
       computing, by the first path computation element, a set of least cost paths across the first domain between the first border node and one of:
       the third border node;
       the second border node;
       a destination node of the first domain if the destination node is in the first domain; or
   when the destination node is not within the first domain, selecting a path computation element in the second domain based at least in part on at least one load balancing criterion.

7. The first path computation element of claim 6, wherein the processor further, in response to being notified of a failed path including one of the second border node and the third border node, computes an alternate path.

8. The first path computation element of claim 6, wherein computing a path includes performing a forward path computation from the first border node to the destination node through one of the second or third border nodes.

9. The first path computation element of claim 6, wherein computing a path includes performing a backward path computation from the first border node to the source node through one of the second or third border nodes.

10. A method of determining a path in a communication network, the method comprising:
    identifying a path computation element at each border node of a plurality of domains;
    selecting a second border node of a second domain based on load balancing criteria; and determining a path between a first border node of a first domain to the second border node of the second domain, the first border node having a first path computation element and the second border node having a second path computation element, wherein a location of the border nodes is advertised by at least one route controller.

11. The method of claim 10, further comprising determining a plurality of shortest paths between border nodes in a path discovery phase prior to processing a path computation request from a source node.

12. The method of claim 10, wherein the path determination is performed in response to a failure along a first path.

13. The method of claim 10, wherein the load balancing criteria includes a volume of traffic through the second border node and a volume of traffic through a third border node of the second domain.

14. The method of claim 10, further comprising determining a shortest path from the second border node to the destination node.

15. The method of claim 14, wherein the shortest path from the second border node to the destination node is determined when a forward path computation is selected.

16. The method of claim 14, wherein the shortest path from the second border node to the source node is determined when a backward path computation is selected.

* * * * *